(12) United States Patent
Crowley

(10) Patent No.: US 9,686,292 B2
(45) Date of Patent: *Jun. 20, 2017

(54) SYSTEM AND METHOD FOR CONTINUOUS DEVICE PROFILING

(71) Applicant: Observable Networks, Inc., Clayton, MO (US)

(72) Inventor: Patrick Crowley, St. Louis, MO (US)

(73) Assignee: Observable Networks, Inc., Clayton, MO (US)

(*) Notice: Subject to any disclaimer, the term of this patent is extended or adjusted under 35 U.S.C. 154(b) by 3 days.

This patent is subject to a terminal disclaimer.

(21) Appl. No.: 14/734,822

(22) Filed: Jun. 9, 2015

(65) Prior Publication Data

US 2015/0271192 A1 Sep. 24, 2015

Related U.S. Application Data

(63) Continuation of application No. 14/064,725, filed on Oct. 28, 2013, now Pat. No. 9,060,014, which is a
(Continued)

(51) Int. Cl.
*G06F 11/00* (2006.01)
*H04L 29/06* (2006.01)
(Continued)

(52) U.S. Cl.
CPC .......... *H04L 63/1408* (2013.01); *H04L 43/12* (2013.01); *H04L 63/1425* (2013.01);
(Continued)

(58) Field of Classification Search
CPC ....................................................... G06F 21/55
(Continued)

(56) References Cited

U.S. PATENT DOCUMENTS 5,987,442 A 11/1999 Lewis et al.
6,405,250 B1 6/2002 Lin et al.
(Continued)

FOREIGN PATENT DOCUMENTS

WO WO-2011149532 A1 12/2011

OTHER PUBLICATIONS

International Search Report and Written Opinion mailed Aug. 28, 2013 in International Patent Application No. PCT/US2013/042276 (14 pages).

*Primary Examiner* — Christopher Brown
(74) *Attorney, Agent, or Firm* — Goodwin Procter LLP

(57) ABSTRACT

A system and method for monitoring, modeling and assessing networked devices. A continuous device profiling (CDP) system builds and maintains device-specific and network-specific behavioral models based on observation of network traffic. The behavioral models may be used for network management, detecting misconfigured or malware infected devices, performing network asset inventory, network access control, network discovery in support of network integration, and information security incident response management. CDP models and monitors the active roles that devices assume on the network based on a set of matching profiles, monitors transitions between roles, and triggers corrective action when role transitions violate the policies of the network.

20 Claims, 6 Drawing Sheets

Related U.S. Application Data continuation of application No. PCT/US2013/042276, filed on May 22, 2013.

(60) Provisional application No. 61/650,666, filed on May 23, 2012.

(51) Int. Cl.
*H04L 29/08* (2006.01)
*H04L 12/26* (2006.01)
*H04L 12/24* (2006.01)

(52) U.S. Cl.
CPC .......... *H04L 67/303* (2013.01); *H04L 41/147* (2013.01); *H04L 43/028* (2013.01); *H04L 2463/144* (2013.01)

(58) Field of Classification Search
USPC .......................................................... 726/22
See application file for complete search history.

(56) References Cited

U.S. PATENT DOCUMENTS

| | | |
|---|---|---|
| 7,788,718 B1 * | 8/2010 | Fei ...................... H04L 63/1458 726/14 |
| 8,151,321 B2 | 4/2012 | Waris |
| 2004/0203755 A1 | 10/2004 | Brunet et al. |
| 2005/0180416 A1 * | 8/2005 | Jayawardena .......... H04L 45/00 370/389 |
| 2007/0294747 A1 | 12/2007 | Rosenberger |
| 2010/0077078 A1 | 3/2010 | Suit et al. |
| 2013/0148572 A1 * | 6/2013 | Delorme ................ H04W 8/26 370/328 |
| 2013/0291107 A1 | 10/2013 | Marck et al. |

\* cited by examiner

SYSTEM AND METHOD FOR CONTINUOUS DEVICE PROFILING

CROSS-REFERENCE TO RELATED APPLICATIONS

The present application is a continuation of U.S. application Ser. No. 14/064,725, filed on Oct. 28, 2013 (now U.S. Pat. No. 9,060,014), which claims priority to U.S. Provisional Patent Application Ser. No. 61/650,666 entitled "Continuous Networked Device Profiling System and Method," filed May 23, 2012, the entirety of which is hereby incorporated by reference.

FIELD OF INVENTION

The present invention relates generally to the field of network communications and, in particular, to systems and methods for network management.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In a packet-switched communications network, packets are the basic unit of communication, and consist of two parts: headers which carry signaling information to establish and maintain a communication channel, and a payload which carries the communication content. Many traditional methods in network security rely on so-called deep-packet inspection (DPI) mechanisms that analyze the payloads of network packets to seek the presence of content patterns of interest.

Current trends in digital network communications are beginning to render DPI ineffective. When a communications channel is encrypted end-to-end, then network-based DPI mechanisms are ineffective. Encryption effectively randomized packet payloads and hence renders them immune from interpretation or analysis.

SUMMARY

The disclosed embodiments relate to systems, methods, apparatus and articles of manufacture for continuously monitoring, characterizing and profiling network devices. Continuous Device Profiling (CDP) addresses, among other features, the impact of data encryption on network management and security. In a CDP system, packet payloads are treated as if they were encrypted, even when they are not encrypted. CDP methods can be applied at any layer in a layered network stack, in which a packet's payload may consist of another packet Disclosed embodiments include methods, apparatus and articles of manufacture for determining a device profile of a network device over one or more observation periods, by inspecting network traffic of the network device without deep packet inspection (DPI); matching the device profile to a first matching profile, based on a set of features derived from the network traffic; monitoring the network traffic of the network device for a device profile transition from the first matching profile to a second matching profile over an additional one or more observation periods; and reacting to the profile transition with a programmed response based on a measure of significance.

Other disclosed embodiments include methods, apparatus and articles of manufacture for predicting behavior of the network device based on a history of profile matches; detecting deviations from predicted future behavior; and taking corrective action based on a measure of significant deviation from the predicted future behavior.

These and other features of various embodiments, together with the organization and manner of operation thereof, will become apparent from the following detailed description when taken in conjunction with the accompanying drawings, in which like reference numerals are used to refer to like parts throughout.

BRIEF DESCRIPTION OF THE DRAWINGS

Provided embodiments are illustrated by way of example, and not of limitation, in the figures of the accompanying drawings in which.

DETAILED DESCRIPTION

Figure 1:
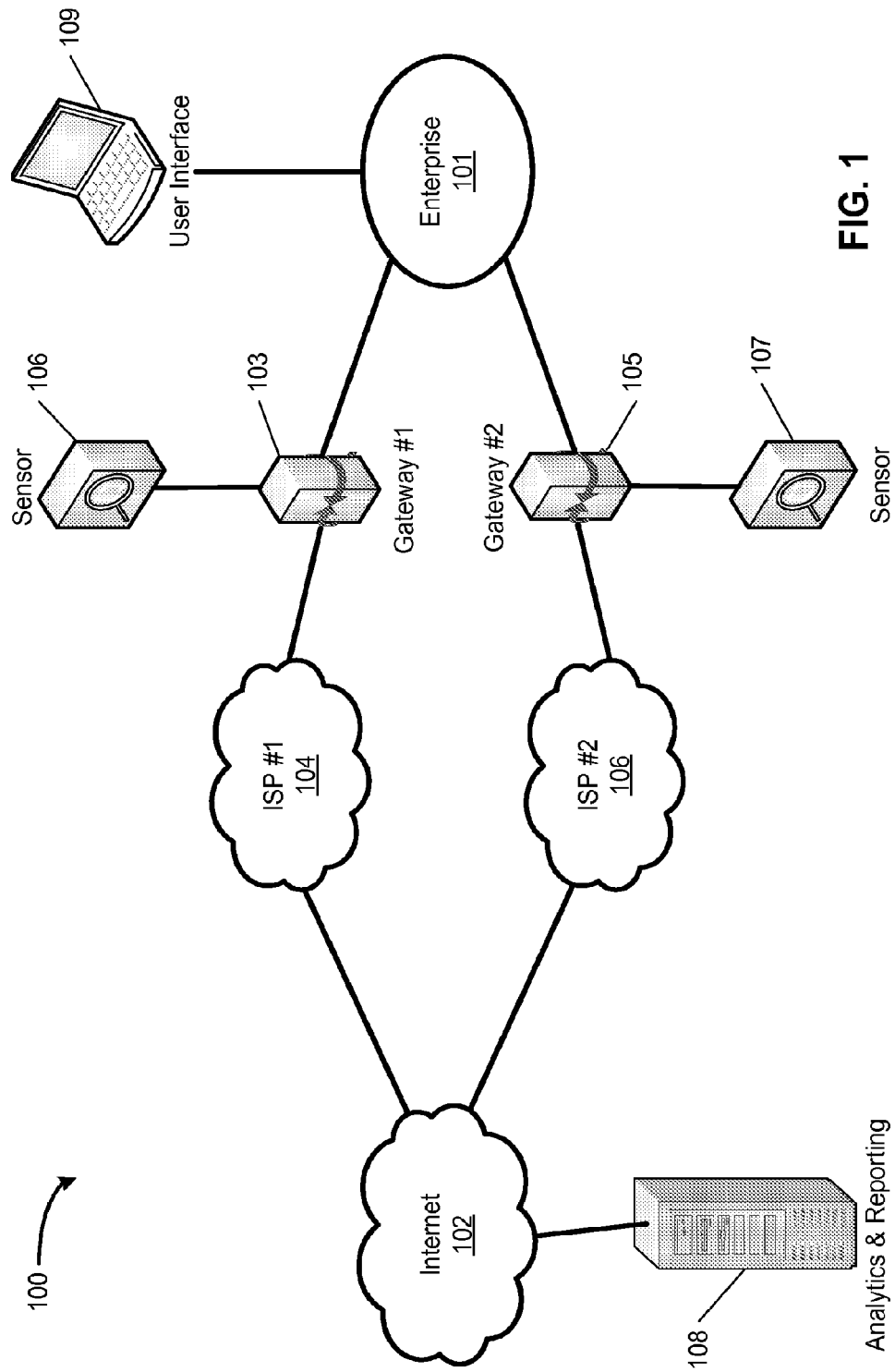
FIG. 1 illustrates an exemplary Internet Gateway deployment in one embodiment.

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program and/or a computer.

By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

Terms associated with continuous device profiling are defined in the following paragraphs.

Domain: Each device in a network belongs to one or more domains, which denote sets of devices, and are typically expressed as ranges of network addresses or sets of unique device IDs. Through the use of domains, machines local to a network (i.e., the local domain) can be distinguished from machines remote with respect to a network (i.e., the remote domain). Similarly, within a local network, domains may be defined that correspond to distinct network segments or operational sub-networks within an enterprise network.

Ports: In network protocols, ports are used to demultiplex incoming traffic to the process or program associated with the traffic. In this way, multiple concurrently active programs can share a network link. Each process or program is dynamically allocated a different port to be used for communications for the duration of its run-time. In TCP/IP (transport control protocol/internet protocol), for example, ports are numbers expressed in 16 bit format. Sessions over protocols such as TCP and UDP (user datagram protocol) will feature two ports, one for the sender and one for the receiver. Many ports are referred to as well-known ports, and are designated for specific use by the Internet Number and Name Authority (IANA).

Observation periods. Time scales over which a CDP system collects device and session information, evaluates profiles, evaluates profile transitions, or calculates time-bounded statistics. Typical observation periods may include, but are not limited to, intervals of 10 seconds, 1 minute, 5 minutes, 10 minutes, 1 hour, 4 hours, 12 hours, 1 day, 1 week, 1 month. An Observation Period Range is a set of observation periods over which a CDP system collects information, evaluates profiles, evaluates profile transitions, or calculates time-bounded device statistics.

Local Policy. An expression (e.g., a Boolean expression) of local rules that specifies allowed, disallowed, suspicious, or otherwise notable device-profile matches, profile transitions, profile group makeup, and profile group trends as defined below. A transition or change is determined to be significant with respect to local policy when local policy defines a response to the triggering condition (e.g., the evaluated expression). An expression will typically take the form of a computer program, or input to a computer program, that can evaluate policy with respect to the past, current, or predicted state of device profiles, profile groups, and profile transitions.

A CDP system includes 1) a packet capture apparatus consisting of one or more network sensors (also referred to herein as "mirrors") deployed in the target network to observe network traffic, 2) a controller including computation, storage, and analytics capability for generating and maintaining device profiles in response to observed network traffic, 3) a set of device and session profiles acquired over one or more observation periods, and 4) a reporting and response function that triggers reactions to changes in device profiles and provides a user-interface.

Figure 2:
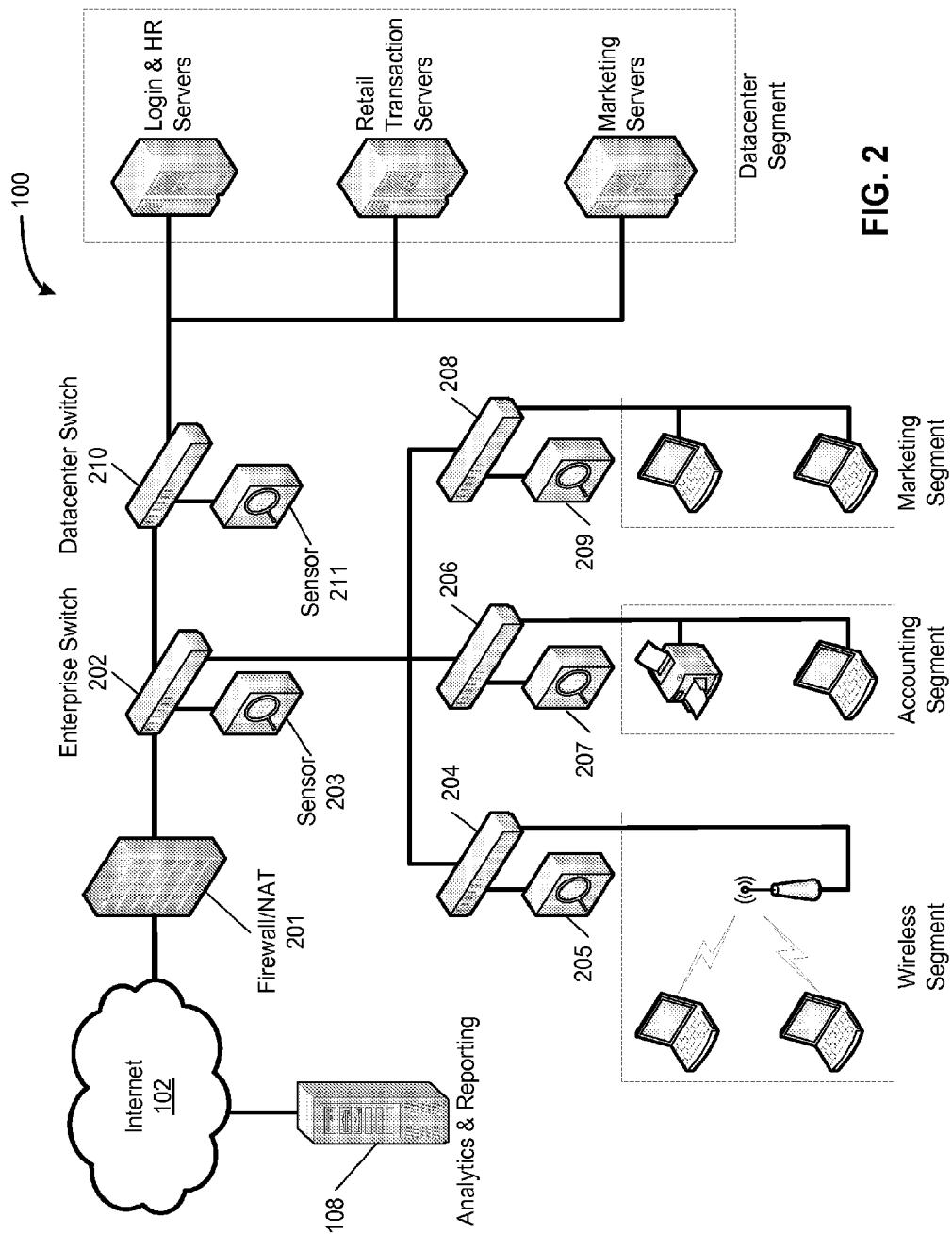
FIG. 2 illustrates an exemplary enterprise network deployment in one embodiment.

Typical examples of CDP systems are illustrated in FIG. 1 and FIG. 2.

FIG. 1 illustrates a gateway deployed CDP system 100 in which an enterprise network 101 accesses the Internet 102 through a first gateway 103 (Gateway #1) and first Internet service provider 104 (ISP#1), and through a second gateway 105 (Gateway #2) and second Internet service provider 106 (ISP#2). Gateway 103 is monitored by sensor 106 and gateway 105 is monitored by sensor 107. Sensors 106 and 107, otherwise known as "observable network appliances (ONAs)," monitor and process all local traffic through their respective gateways. The sensors provide for analysis of network traffic without perturbing the network traffic. Network events over short-term observation periods (e.g., 10 seconds or less) may be processed locally by the ONAs, while longer term network events (e.g., changes over observation periods greater than 10 seconds) may be reported over the Internet 102 to an ONA analytics and reporting server 108 for remote processing. It will be appreciated that the distribution of local and remote processing may be varied according to different observation period thresholds. The analytics and reporting infrastructure, which is responsible for evaluating profiles, can also be located within the local network, and it can be implemented in a hybrid fashion, with a portion of the tasks carried out locally in the sensors 106 and 107, and a portion off-site in analytics and reporting server 108. Reports may be provided to a user interface 109.

FIG. 2 illustrates the details of an enterprise deployed system 200 in which sensors are deployed in different enterprise segments in addition to the enterprise gateway. This configuration allows for different local policies to be applied to individual enterprise segments, as described in greater detail below. As illustrated in FIG. 2, Internet traffic enters and leaves the enterprise through a firewall/NAT (network address translation) device 201, which may be any commercially available firewall device or system as is known in the art. All Internet data packets flow through enterprise switch 202 and are mirrored by sensor 203. Enterprise switch 202 routes network traffic to various enterprise networks through segment switches that, in this example deployment, includes a wireless segment switch 204, an accounting segment switch 206, a marketing segment switch 208 and a datacenter switch 210. Network traffic in the wireless segment is mirrored by sensor 205, network traffic in the accounting segment is mirrored by sensor 207, network traffic in the marketing segment is mirrored by sensor 209, and network traffic in the datacenter segment is mirrored by sensor 211. Each of these enterprise segment sensors may implement customized local policies with respect to access to internal and external resources and data as determined by a network administrator, for example.

A CDP system captures, processes, and logs subsets of time-stamped header information, which can include among other things: source and destination addresses, source and destination ports, packet sizes, protocol and status bits, and the arrival time of the packet. A CDP system may also optionally captures all arriving Domain Name System (DNS) mappings between user-readable domain names and network addresses. DNS packets are not encrypted, and DNS payloads are the only ones a CDP system will process in their entirety. A CDP system also optionally supports an end-host agent, which can be installed and executed on computer devices on a network, that records and reports to a CDP controller which user, operating system process or binary executable was responsible for each network communication associated with the device.

A CDP system may also capture arriving Domain Name System (DNS) mappings between user-readable domain names and network addresses. It will be appreciated that DNS packets are not encrypted, so their payloads can be processed.

A CDP system may optionally support an end-host agent installed & executed on a network device that records and reports to the CDP controller a user (user-aware), process (process-aware) or program (application-aware) responsible for the communication associated with the network device Devices in a CDP system may be identified by a unique ID or a network address. Devices can be physically identifiable servers or hardware devices, virtually identifiable virtual machines, virtual appliances, or virtual devices.

As used herein, a virtual machine (VM) is a software implementation of a machine (i.e. a computer) that executes programs like a physical machine. Virtual machines are separated into two major classifications, based on their use and degree of correspondence to any real machine. A system virtual machine provides a complete system platform which supports the execution of a complete operating system (OS). These usually emulate an existing architecture and are built with the purpose of either providing a platform to run programs where the real hardware is not available for use (for example, executing software on otherwise obsolete platforms), or of having multiple instances of virtual machines lead to more efficient use of computing resources, both in terms of energy consumption and cost effectiveness (known as hardware virtualization, the key to a cloud computing environment), or both. A process virtual machine is designed to run a single program, which means that it supports a single process. Such virtual machines are usually closely suited to one or more programming languages and built with the purpose of providing program portability and flexibility. A characteristic of a virtual machine is that the software running inside the virtual machine is limited to the resources and abstractions provided by the virtual machine—it cannot break out of its virtual environment.

A virtual appliance is a virtual machine image designed to run on a virtualization platform. Virtual appliances are a subset of the broader class of software appliances. Installation of a software appliance on a virtual machine creates a virtual appliance. Like software appliances, virtual appliances are intended to eliminate the installation, configuration and maintenance costs associated with running complex stacks of software. A virtual appliance is not a complete virtual machine platform, but rather a software image containing a software stack designed to run on a virtual machine platform.

A virtual device mimics a physical hardware device, essentially tricking the CPU into believing that a device exists when it really doesn't. For example, fax software can act as a virtual printer. When print is selected, the document is sent to a fax/modem virtual device, which then sends information to another fax/modem or fax machine instead of a printer printing the file.

Also as used herein, a session is defined as an instance of communication between a set of devices, most commonly a point-to-point communication between two devices. A session corresponds to the transmission or reception of one or more packets sent between devices participating in the session. Information from a session is used to determine and evaluate (give values to) a set of features. The feature values provide inputs to profile matching routines.

Session features include device IDs or addresses, ports, packet counts, packet sizes and bidirectional byte counts between participating devices, and protocol and status bits indicating the state of the communication channel (including the specific protocol in use, whether a connection was established, how often a connection experienced dropped packets, or whether a connection experienced congestion (e.g., time-stamp processing?)

For example, a TCP session may be one in which the packet headers specify that the TCP protocol is in use. For example, a "TCPConnected" session is one in which the packets in the session successfully conducted the 3-way TCP handshake that is used to establish a communications channel. Other illustrative session profiles include, for example, UDP, TCPNotConnected, Lossy, Congested, Upload, Download, BalancedUpDown, NoData.

Network devices may be characterized by a number of device features in addition to session features. Device features may include the following, for example:

Active Port Set: The Active port set (APSet) is defined as the set of ports that the network device uses to communicate. The APSet may contain both specific ports and port ranges.

Connection Set: The Connection set (CSet) is the set of devices that communicate with the network device. The CSet can be referred to on a per-port basis with a subscript notation such as CSet[a, b] where a is the port active on the network device, and b is the port active on the communicating device; wildcards and ranges can also be used. For example, CSet[tcp/80, *] could indicate the set of communicating devices that sent traffic to or received traffic from TCP port 80 on the network device, with any port on the communicating device.

Connectivity: Connectivity is the magnitude of the CSet. The number of unique connected devices, where a connected device is one that sent traffic to or received traffic from the subject network device.

Volume: the total number of bytes sent and received by the network device.

Selectivity: the connectivity of the network device's connected devices. This feature can be expressed both in aggregate, on a per-port basis, or on a per-profile basis.

Attendance: a measure of how often the network device contributes traffic to the network within one or more observation periods. For example, many servers, such as email servers and web servers, would likely have full attendance at hourly and daily observation periods. A CDP system can represent attendance in a number of ways or combinations of ways, including categorically, with category labels such as "never", "sometimes", or "always", numerically with a real number value or a percentage, or via a mathematical model that can record and report historical attendance or predict expected attendance in past or future observation periods.

Gregarity: the attendance of the network device's connected devices within one or more observation periods.

In a CDP system, a device profile is defined as a set of device features where each device feature in the set has an allowed range of values that a network device must exhibit in order to match the device profile. Each device feature or combination of features can be characterized by a categorical label such as "high," "medium" or "low" with respect to a statistical or mathematical model that represents a nominal or expected value of the feature for a given device in a given role (i.e., a matching profile).

Profile matching is conducted over a range of observation periods. A device in a given observation period matches a profile when its observed characteristics fall within the defined feature ranges in the device profile. A device can match one or more profiles in the same observation period. All devices that match a profile P belong to the profile group for P. Within a profile group, a CDP system may maintain rankings and orderings of the matching devices based on their relative device profile values, such as Volume, Connectivity, or Gregarity, for example. A device can match more than one profile at any given time and the set of profiles that the device matches may be used to define a role for the device as described in greater detail below.

A CDP system may be configured to define profile matching to mean either a binary yes/no matching, or a weighted probability of matching. Binary matching allows the use of definitive device labels such as printer, router, webserver or webclient, for example. In probabilistic matching, a device will match a profile with some probability. A given device may match one or more device profiles if the weighted probability of a match is above a given probability threshold, beyond which the device is presumed to belong to the given profile group.

Device profiles may be organized into a taxonomy. A CDP system can be configured to define its own device features and ranges of feature values, and its own set of device profiles. Device profiles may be defined categorically, for example, as base profiles, declared profiles, role profiles, and aggregate profiles.

Base profiles include "Active" and "InActive." An active device has a non-empty CSet in a specific observation period. An InActive device has an empty CSet in the specified observation period, but has a non-empty CSet in at least one other observation period in a specified observation period range.

Declared profiles can come in at least two forms. First, individual devices on a local domain can be assigned explicit profiles based on a well-defined role on the network. For example, most local networks have explicitly defined Domain Name Servers, and these devices could be explicitly labeled as matching a "NameServer_Declared" profile. With such declared profiles, expected and observed NameServers can be monitored and compared continuously. A second form of declared profile consists of watch lists comprising sets of devices that are defined to be of interest. For example, a set of known Internet-based botnet command and control devices (typically referred to as an address, port pair) could be maintained in a "BotNetCC" watchlist. For example, any device in a local domain with a BotNetCC watchlist member appearing in its CSet with a matching port in its APSet could be assigned to a "BotNetCCNode" profile.

A device is assigned a network role when it matches a set of profiles corresponding to a defined network role. For example, a device may be assigned to a WebClient role over one or more observation periods if the following conditions are satisfied: one or more of its CSet entries belong to a WebServer profile group; its APSet includes ports that are commonly associated with web traffic such as TCP ports 80, 8080 or 443; one or more of its CSet entries have low selectivity; the device's attendance and gregarity match a typical workday pattern; and the device has a volume and connectivity that is typical of a web client on the network.

Consider, for example, a network with two domains, one local and one remote, where the local domain includes two devices, LD1 and LD2 and the remote domain includes three devices, RD1, RD2, and RD3. At the time of installation, assume that the CDP system is configured with three declared profiles: declared profile WebClient is assigned to LD1; declared profile WebServer is assigned to RD1 and RD2. Given a WebClient profile like the one described above, we can consider the following example.

Over a given observation period, assume that LD1 and LD2 are observed to have identical CSets, consisting of RD1, RD2, and RD3, which are all active on remote port tcp/80, and identical volume. Assume also that during the observation period, the hourly attendance and gregarity for LD1 and LD2 matches a typical work-day pattern for this network: zero attendance (i.e., no traffic) in the hours between 8 pm and 6 am, and full attendance (i.e., some traffic each hour) between 6 am and 8 pm. The selectivity for LD1 and LD2 is minimal, because each connected device connects to all local devices. The procedure for profile matching in this CDP system would begin by recognizing that LD1 is a Declared WebClient profile match. Since LD2 has volume and connectivity quantitatively similar (numerically identical in this example) to WebClient LD1, and because the other features match the WebClient definition, LD2 would be assigned the WebClient role profile during this observation period.

Given this example, a person of skill in the art could extend this CDP system in a number of ways: in scale by increasing the number of domains and devices, and in profile type by establishing other profile types with varying feature definitions.

Other examples of role profiles that will be recognized by those of skill in the art include, WebServer, WebProxy, FileConsoleClient, FileConsoleServer, IRCClient, IRCServer, MailClient, MailServer, NameClient, NameServer, RDPClient, RDPServer, TimeClient, TimeServer, SkypeNode, SkypeSuperNode, VPNClient, VPNServer, PortScanner, AddressScanner, BeaconOrigin, BeaconDestination, TorRelay, TorExit, BitTorrentNode, and P2PNode. Additionally, a NoMatch role profile may be assigned to a device that does not match any other defined profile.

Aggregate profiles are defined in terms of subsets of matching Base and Role profiles. As with other profiles, a CDP system can define Aggregate profiles in a number of ways. For example, a "UserAccessTerminal" aggregate profile could be defined as matching any device that matches one or more locally-defined client-oriented role profiles. Other illustrative examples include NATnode, GenericProxy, AccessPoint profiles.

Given a history of matching profiles, each device can be inspected with respect to its history of profile matches and transitions between matches. In a CDP deployment, local policies can be defined that trigger reactions such as alerts, notifications, or systematic quarantining actions for certain profile transitions for certain devices. Additionally, a CDP system can incorporate information from separate systems, such as those that are user-aware, application-aware, and content-aware, in order to further annotate profile and behavioral information.

For example, in most cases a NameServer should not transition to matching both the NameServer profile and the WebServer profile. Such a transition may indicate a security compromise or some other unauthorized use of the system. Similarly, devices matching the WebClient profile should typically not also in future observation periods match the AddressScanner or PortScanner profile. In these cases, for example, a CDP system could interact with a user-aware identity system to associate the profile match in this observation period with the authenticated user on the system. In a similar way, application-aware and content-aware systems could associate active applications and transmitted content to the profile match in the observation period.

Additionally, standard mathematical machinery, such as Bayesian models or kernel-based probabilistic models, can be used to produce predictive models to estimate the nature of profile matches in future observation periods. The accuracy of such predictive models is a strong indicator of the effectiveness of a CDP system.

Given a history of matching profiles in a CDP system, entire populations of machines can be examined for their transitions through time. In a local domain, for example, it is often productive to monitor the relative standing and significance, expressed in terms of device feature values, of devices within each profile group. Many well-known variants of statistical modeling techniques can be used to establish baselines for profile group sizes and makeups; variations against baseline characteristics can be assigned a weighted significance based on historical observations.

When profile transitions and profile group changes are determined to be significant with respect to local policy, a CDP system may respond with a range of automated actions. These may include, among others: email or SMS message alerts, firewall rule insertion or modification, network segment or virtual local area network (VLAN) reassignment, or logging to a repository or event management system. An illustration of this process is shown in FIG. 3.

Figure 3:
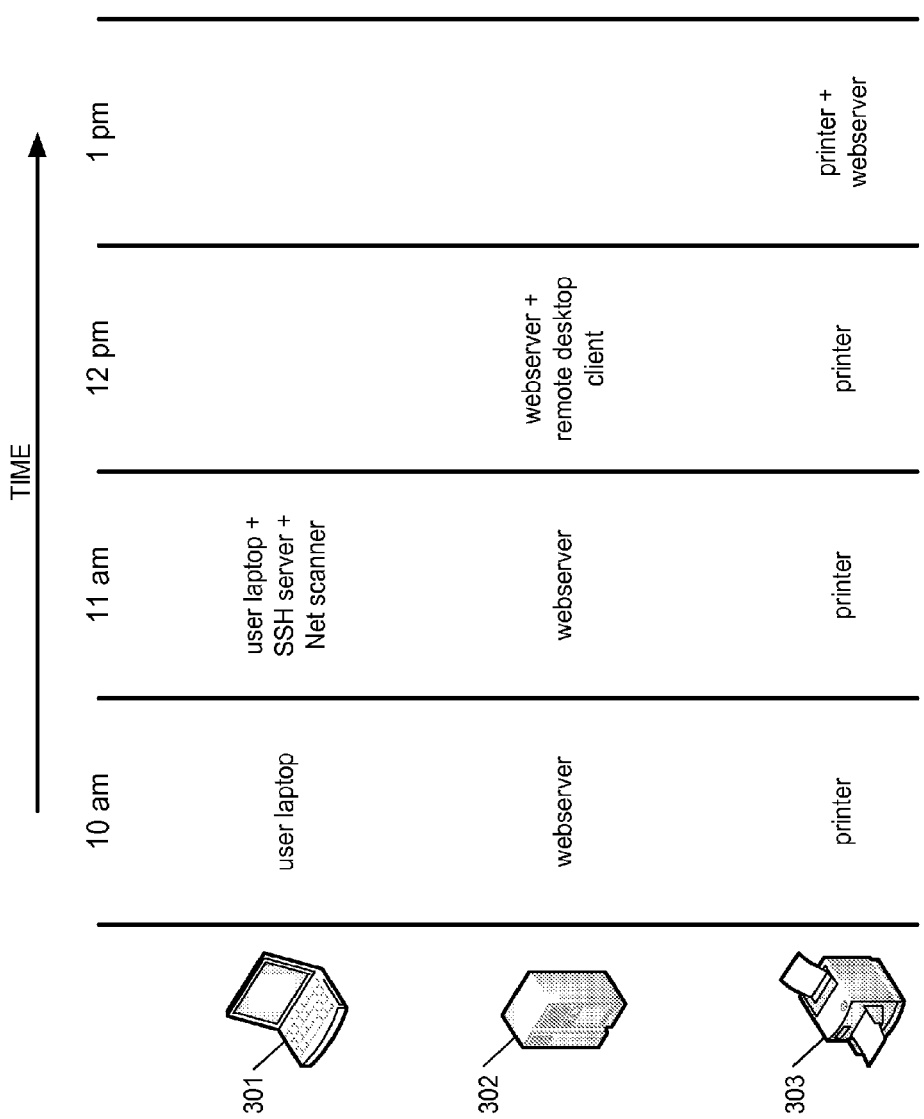
FIG. 3 illustrates an example of device profiling over time.

FIG. 3 illustrates an example of a network profile timeline for three exemplary network devices; a user laptop 301, a webserver 302 and a printer 303 over observation periods with a granularity of 1 hour. In the first observation period (10 am hour), each device is assigned a declared profile corresponding to its observed behavior. In the second observation period, the features of the nominal use laptop match not only the user laptop profile, but also match a SSH (secure shell protocol) server profile and a net scanner profile. Because the latter two profiles are normally associated with elevated network privileges (e.g., with network technicians or administrators) not given to an end-user, such a profile transition could indicate a security threat. Accordingly, the local policies of the network could trigger a response to this profile transition such as issuing an alert to the network administrator, limiting access to network resources or quarantining the device entirely.

Continuing with the example of FIG. 3, the webserver undergoes a role transition in the 12 pm observation period from a pure webserver profile to a role that includes both webserver and remote desktop client profiles. This transition could indicate presence of malware, for example, and depending on the local policies in place, could trigger a reaction that limits the infected device to local network traffic while alerting the network administrator of the condition.

A final example is illustrated in FIG. 3 in the 1 pm observation period where the printer transitions from its expected profile to a network role that also includes the profile of a webserver, an anomalous condition normally associated with compromised network security that could also trigger a reaction as a function of defined local network policies.

Figure 4:
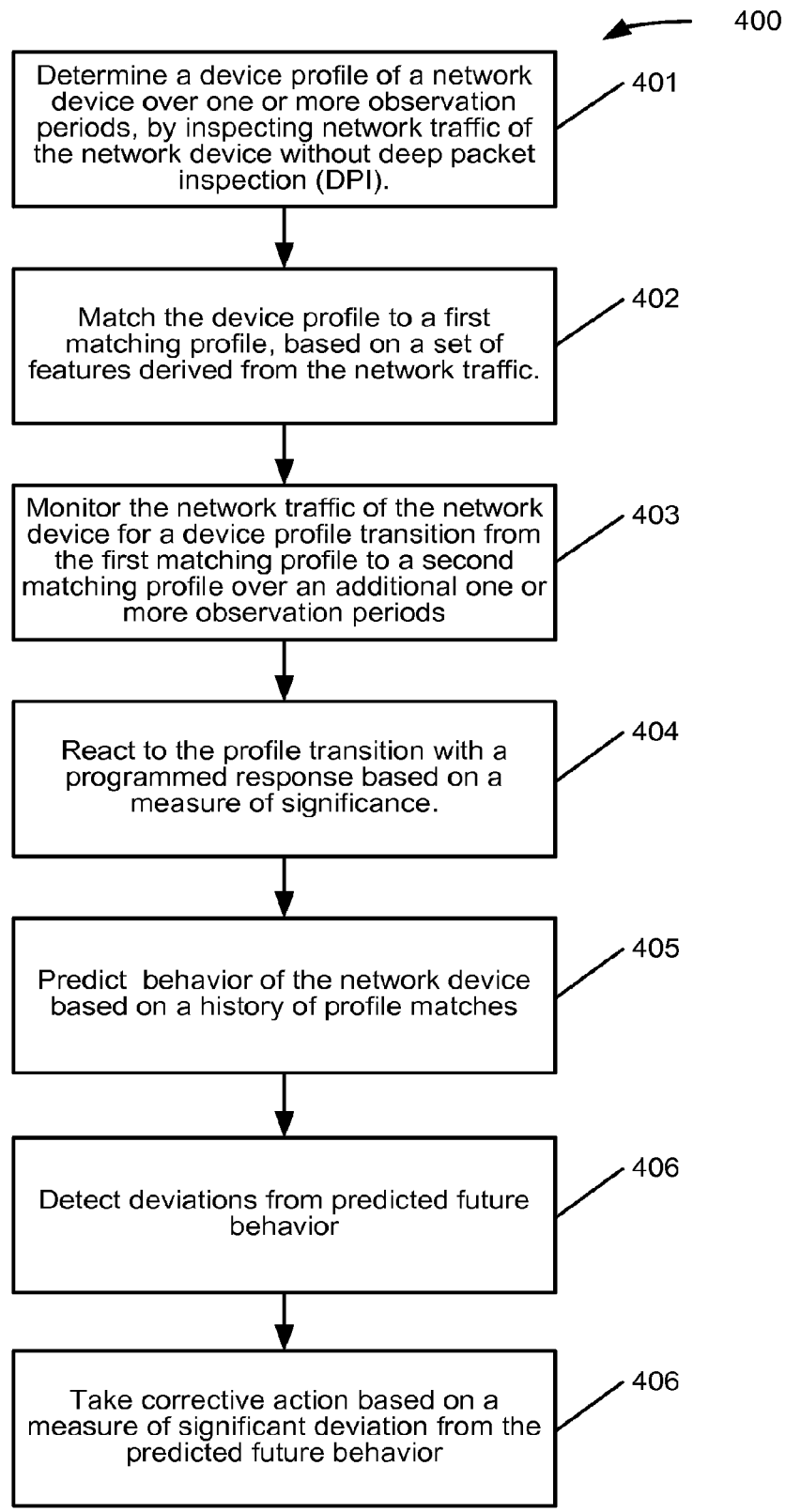
FIG. 4 is a flowchart illustrating a method for continuous device profiling in one embodiment.

FIG. 4 is a flowchart illustrating an exemplary method 400 in an observable network appliance (ONA) according to aspects of the disclosed invention. The method begins at operation 401, where the ONA determines a device profile of a network device over one or more observation periods, by inspecting network traffic of the network device without deep packet inspection (DPI). The method also includes operation 402, where the ONA matches the device profile to a first matching profile, based on a set of features derived from the network traffic. In operation 403, the ONA monitors the network traffic of the network device for a device profile transition from the first matching profile to a second matching profile over one or more additional observation periods. In one embodiment, the method concludes at operation 404 when the ONA reacts to the profile transition with a programmed response based on a measure of significance. In other embodiments, the method also includes operation 405, where the ONA predicts the future behavior of the network device based on a history of profile matches, detects deviations from predicted behavior in operation 406, and takes corrective action in operation 407 based on a measure of significant deviation from the predicted future behavior of the network device.

Figure 5:
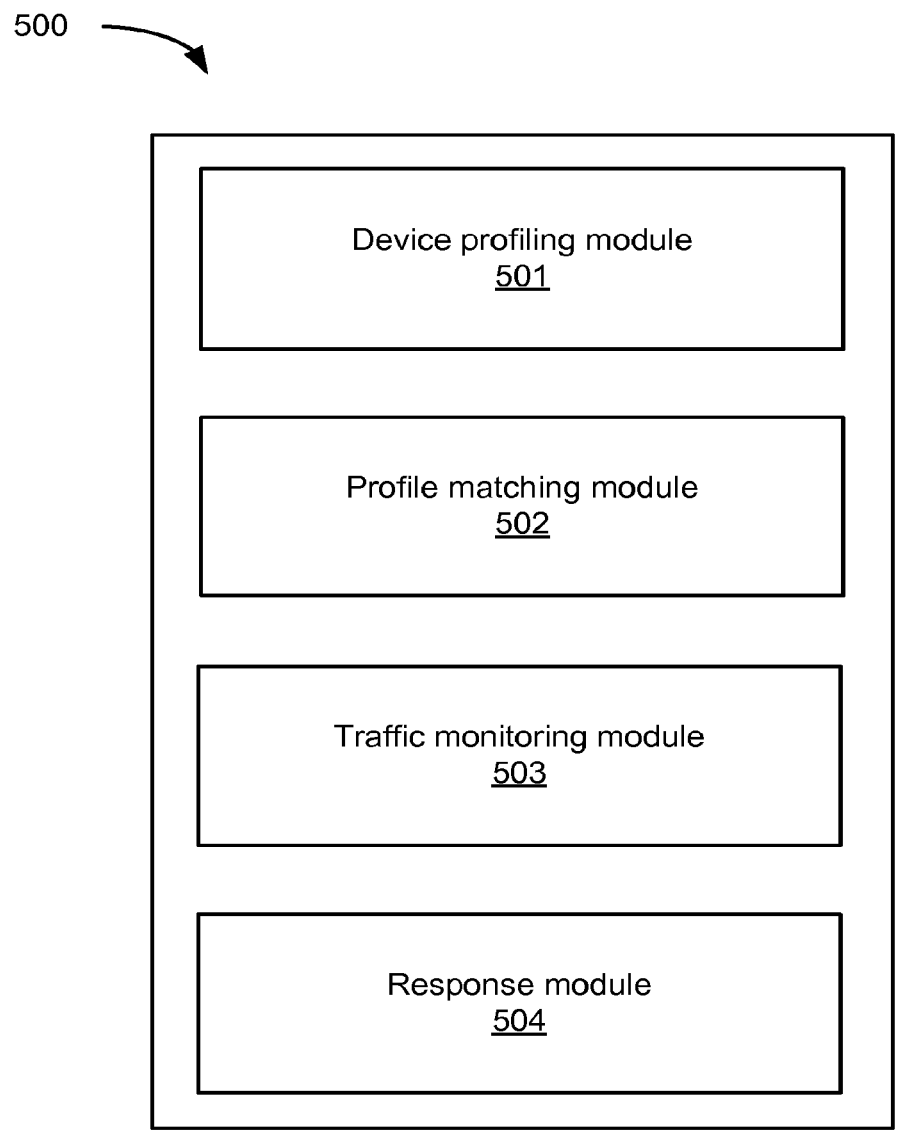
FIG. 5 illustrates an exemplary apparatus in which the method of FIG. 4 may be performed.

FIG. 5 illustrates an exemplary apparatus 500 such as may perform the method 400. The apparatus may be described as an implementation of element 108 in FIGS. 1 and 2, of elements 106 and 107 in FIG. 1, of elements 203, 205, 207, 209 and 211 in FIG. 2 and in general as an implementation of an observable network appliance (ONA) as described herein. As shown, the apparatus may include a device profiling module 501 for determining a device profile of a network device over one or more observation periods, by inspecting network traffic of the network device without deep packet inspection (DPI). Apparatus 500 may also include a profile matching module 502 for matching the device profile to a first matching profile, based on a set of features derived from the network traffic. The apparatus 500 may also include a traffic monitoring module 503 for monitoring the network traffic of the network device for a device profile transition from the first matching profile to a second matching profile over an additional one or more observation periods. Finally, apparatus 500 may include a response module 504 for reacting to the profile transition with a programmed response based on a measure of significance.

For purposes of simplicity of explanation, the methods above are shown and described as a series of operations. It is to be understood that the methods are not limited by the order of operations, as some operations can, in accordance with one or more embodiments, occur in different orders and/or concurrently with other operations from that shown and described herein. For example, those skilled in the art will understand and appreciate that a method could alternatively be represented as a series of interrelated states or events, such as in a state diagram. Moreover, not all illustrated operations may be required to implement a method in accordance with one or more of the disclosed embodiments.

Figure 6:
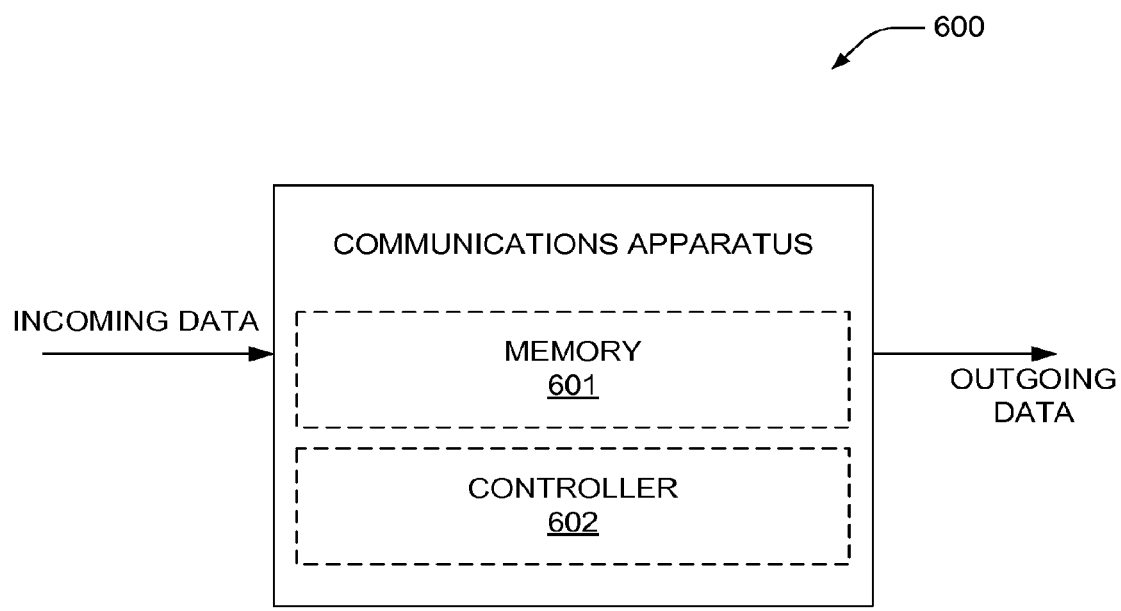
FIG. 6 illustrates an apparatus in which aspects of the present disclosure may be implemented.

FIG. 6 illustrates a communications apparatus 600 within which various disclosed embodiments may be implemented. In particular, the apparatus 600 that is illustrated in FIG. 6 may comprise at least a portion of a CDP system or an ONA as described herein. The apparatus 600 can be resident within a network such as network 100 depicted in FIG. 1 or network 200 depicted in FIG. 2, and can receive and monitor network traffic associated with one of more network devices over one or more observation periods, as described herein.

FIG. 6 further illustrates that the apparatus 600 can include a memory 601 that can retain instructions for performing one or more operations, such as network traffic monitoring, analysis and the like. Additionally, the apparatus 600 of FIG. 6 may include a controller 602 that can execute instructions that are stored in the memory 601 and/or instructions that are received from another device. The instructions can relate to, for example, configuring or operating the apparatus 600 or a related communications apparatus. It should be noted that while the memory 601 that is depicted in FIG. 6 is shown as a single block, it may comprise two or more separate memories that constitute separate physical and/or logical units. In addition, the memory while being communicatively connected to the controller 602, may reside fully or partially outside of the apparatus 600 that is depicted in FIG. 6. It is also to be understood that one or more modules, such as the device profiling module 501, the profile matching module 502, the traffic monitoring module 503 and the response module 504 that are shown in FIG. 6, can exist within a memory such as memory 601.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM) or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It is to be understood that the embodiments and features that are described herein may be implemented by hardware, software, firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, or twisted pair, then the coaxial cable, fiber optic cable, or twisted pair are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules represent examples of program code for executing steps of the methods disclosed herein. The particular sequence of such executable instructions or associated data structures represents examples of corresponding acts for implementing the functions described in such steps or processes.

The various illustrative logics and modules described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions and so on) that perform the functions described herein. The software codes may be stored in memory units and executed by processors. The memory unit may be implemented within the processor and/or external to the processor, in which case it can be communicatively coupled to the processor through various means as is known in the art. Further, at least one processor may include one or more modules operable to perform the functions described herein.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM or any other form of storage medium known in the art. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for correcting a deviating network device of a plurality of network devices using a programmed response based on a measure of significance of a detected deviation from a predicted future device behavior based on a corresponding network device history of matching device profiles and a corresponding history of device profile transitions for the deviating network device, the method, employing a processing device and a data storage device, comprising:
storing, by the data storage device, for a first network device, a matching device profile history and a device profile transition history;
storing, by the data storage device, for a second network device, a matching device profile history and a device profile transition history, wherein matching device profile histories and device profile transition histories differ according to a device type of each of the plurality of network devices and wherein the matching device profile history and device profile transition history for the first network device differ from the match device profile history and device profile transition history for the second network device;
receiving, by the processing device, from the plurality of network devices, over one or more first observation periods, a plurality of network traffic for each of the first and the second network devices;
determining, using the plurality of network traffic, a first device profile from the plurality of network traffic;
comparing, by the processing device, the first device profile to each of the matching device profile histories for the first network device and the second network device;
matching, by the processing device, the first device profile to matching device profiles of the first network device and the second network device, wherein a first matching device profile for the first network device differs from a first matching device profile for the second network device;
monitoring, by the processing device, over one or more second observation periods, the plurality of network traffic of the one of the first network device or the second network device for a device profile transition, wherein the device profile transition comprises a device profile transition from the first matching device profile for the respective network device to a second matching device profile for the respective network device;
comparing, by the processing device, the monitored device profile transition to the corresponding device profile transition history of the one of the first network device or the second network device;
predicting, by the processing device, future device behavior of the one of the first network device or the second network device, based on the comparison;
detecting a deviation from predicted future device behavior for the one of the first network device or the second network device; and
correcting, using the programmed response, the detected deviation for the one of the first network device or the second network device.

2. The method of claim 1, wherein determining the device profile comprises:
capturing and time-stamping network packet header information; and
determining a feature set based on the header information.

3. The method of claim 2, wherein the feature set comprises at least one of a device feature set and a session feature set.

4. The method of claim 3, wherein the device feature set comprises one or more of an active port set, a connection set, a volume metric, a connectivity metric, a selectivity metric, an attendance metric and a gregarity metric.

5. The method of claim 3, wherein a session comprises transmitting or receiving at least one data packet, and wherein the session feature set comprises one or more of device names, device addresses, port numbers, communication protocol, and bidirectional packet counts and packet sizes.

6. The method of claim 2, wherein the first matching device profile comprises an acceptable range of values for each feature in the feature set.

7. The method of claim 1, wherein the first device profile comprises at least one of a base profile, a declared profile, a role profile and an aggregate profile.

8. The method of claim 1 further comprises assigning each of the plurality of network devices to one or more device profile groups based on one of a deterministic device profile match and a probabilistic device profile match.

9. The method of claim 8, wherein members of a device profile group are categorized with respect to typical and atypical behavior.

10. The method of claim 9, wherein members of the device profile group are categorized as: known devices, unusual devices, unknown devices, and bad devices.

11. The method of claim 1, further comprising mapping Domain Name System (DNS) between user-readable domain names and network addresses.

12. The method of claim 1, further comprising receiving one or more of user-specific data, application-specific data, and content-specific data from an end-host agent installed in the network device.

13. The method of claim 1, wherein matching the first device profile occurs within an observation period and characteristics of the first or the second network device fall within at least one defined feature range in the first device profile.

14. The method of claim 1, wherein at least one of the first and the second network devices matches a plurality of device profiles.

15. The method of claim 14 further comprising defining a role for at least one of the first and the second network devices, using the plurality of device profiles matched by the corresponding network device.

16. The method of claim 14 further comprising assigning a network role for at least one of the first and the second network devices when the corresponding network device matches a plurality of device profiles that define the network role.

17. The method of claim 1, wherein correcting the detected deviation comprises measuring a level of deviation from the predicted future device behavior.

18. The method of claim 1 further comprising maintaining at least one of a ranking and an ordering of matching network devices based on relative device profile values.

19. The method of claim 18, wherein relative device profile values are selected from the group comprising volume, connectivity, and gregarity.

20. A system for correcting a deviating network device of a plurality of network devices action using a programmed response based on a measure of significance of a detected deviation from a predicted future device behavior based on a corresponding network device history of matching device profiles and a corresponding history of device profile transitions for the deviating network device, comprising:
   a processing device;
   a data storage device in communication with the processing device for storing:
      a matching device profile history and a device profile transition history for a first network device, and
      a matching device profile history and a device profile transition history for a second network device, wherein matching device profile histories and device profile transition histories differ according to a device type of each of the plurality of network devices and wherein the matching device profile history and device profile transition history for the first network device differ from the matching device profile history and device profile transition history for the second network device;
   a device profiling module that is structured and arranged to receive from the plurality of network devices, over one or more first observation periods, a plurality of network traffic for each of the first and of the second network device and to determine, using the plurality of network traffic, a first device profile from the plurality of network traffic;
   a profile matching module that is structured and arranged to compare the first device profile to the matching device profile histories for the first network device and the second network device in the data storage device and to match the first device profile to matching device profiles of the first network device and the second network device, wherein a first matching device profile for the first network device differs from a first matching device profile for the second network device;
   a traffic monitoring module that is structured and arranged to monitor over one or more second observation periods, the plurality of network traffic of the one of the first network device or the second network device for a device profile transition, wherein the device profile transition comprises a device profile transition from the first matching device profile for the respective network device to a second matching device profile for the respective network device;
   a non-transitory machine-readable medium having processor executable instructions that, when executed by the processing device, configures the system to:
      compare the monitored device profile transition to the corresponding device profile transition history of the one of the first network device or the second network device,
      predict, by the processing device, future device behavior of the one of the first network device or the second network device, based on the comparison, and
      detect a deviation from predicted future device behavior for the one of the first network device or the second network device; and
   a response module that is structured and arranged to correct, using the programmed response, the detected deviation for the one of the first network device or the second network device.

* * * * *

UNITED STATES PATENT AND TRADEMARK OFFICE
CERTIFICATE OF CORRECTION

PATENT NO. : 9,686,292 B2  
APPLICATION NO. : 14/734822  
DATED : June 20, 2017  
INVENTOR(S) : Patrick Crowley Page 1 of 1

It is certified that error appears in the above-identified patent and that said Letters Patent is hereby corrected as shown below:

Column 13, Line 59, Claim 1, delete "match", insert --matching--.

Signed and Sealed this
Second Day of January, 2018

Joseph Matal
*Performing the Functions and Duties of the*
*Under Secretary of Commerce for Intellectual Property and*
*Director of the United States Patent and Trademark Office*